US007295516B1

(12) United States Patent
Ye

(10) Patent No.: US 7,295,516 B1
(45) Date of Patent: Nov. 13, 2007

(54) EARLY TRAFFIC REGULATION TECHNIQUES TO PROTECT AGAINST NETWORK FLOODING

(75) Inventor: Baoqing Ye, Nashua, NH (US)

(73) Assignee: Verizon Services Corp., Waltham, MA (US)

( * ) Notice: Subject to any disclaimer, the term of this patent is extended or adjusted under 35 U.S.C. 154(b) by 1068 days.

(21) Appl. No.: 10/010,774

(22) Filed: Nov. 13, 2001

(51) Int. Cl.
  H04J 1/16 (2006.01)
  H04J 3/16 (2006.01)
  G06F 11/00 (2006.01)
(52) U.S. Cl. .................. 370/232; 370/236; 370/468; 726/22
(58) Field of Classification Search ..... 370/229–236.1, 370/395.1, 465
See application file for complete search history.

(56) References Cited

U.S. PATENT DOCUMENTS

| | | | | |
|---|---|---|---|---|
| 4,769,811 A | * | 9/1988 | Eckberg et al. | 370/236 |
| 5,090,011 A | * | 2/1992 | Fukuta et al. | 370/230 |
| 5,309,431 A | * | 5/1994 | Tominaga et al. | 370/235 |
| 5,457,687 A | * | 10/1995 | Newman | 370/232 |
| 5,706,279 A | * | 1/1998 | Teraslinna | 370/232 |
| 5,835,484 A | * | 11/1998 | Yamato et al. | 370/230 |
| 5,901,140 A | * | 5/1999 | Van As et al. | 370/236 |
| 5,914,936 A | * | 6/1999 | Hatono et al. | 370/230 |
| 6,028,842 A | * | 2/2000 | Chapman et al. | 370/235 |
| 6,144,714 A | * | 11/2000 | Bleiweiss et al. | 375/376 |
| 6,208,653 B1 | * | 3/2001 | Ogawa et al. | 370/395.52 |
| 6,424,620 B1 | * | 7/2002 | Nishihara | 370/229 |
| 6,463,036 B2 | * | 10/2002 | Nakamura et al. | 370/236.1 |
| 6,657,961 B1 | * | 12/2003 | Lauffenburger et al. | 370/231 |
| 6,724,721 B1 | * | 4/2004 | Cheriton | 370/229 |
| 6,735,702 B1 | * | 5/2004 | Yavatkar et al. | 726/13 |
| 6,865,185 B1 | * | 3/2005 | Patel et al. | 370/412 |
| 7,058,015 B1 | * | 6/2006 | Wetherall et al. | 370/236 |
| 7,062,782 B1 | * | 6/2006 | Stone et al. | 726/22 |
| 7,092,357 B1 | * | 8/2006 | Ye | 370/230 |
| 7,188,366 B2 | * | 3/2007 | Chen et al. | 726/23 |
| 2002/0101819 A1 | * | 8/2002 | Goldstone | 370/229 |
| 2003/0172289 A1 | * | 9/2003 | Soppera | 713/200 |

OTHER PUBLICATIONS

H-Y Chang S. F. Wu, C. Sargor, and X. Wu, "Towards Tracing Hidden Attackers on Untrusted IP Networks", pp. 1-19.
S. Savage, D. Wetherall, A. Karlin and T. Anderson, "Practical Network Support for IP Traceback", Technical Report UW-CSE-00-02-01, University of Washington, 6 pgs.

(Continued)

Primary Examiner—Chau Nguyen
Assistant Examiner—Nittaya Juntima

(57) ABSTRACT

Methods and apparatus for providing an Anti-Flooding Flow-Control (AFFC) mechanism suitable for use in defending against flooding network Denial-of-Service (N-DoS) attacks is described. Features of the AFFC mechanism include (1) traffic baseline generation, (2) dynamic buffer management, (3) packet scheduling, and (4) optional early traffic regulation. Baseline statistics on the flow rates for flows of data corresponding to different classes of packets are generated. When a router senses congestion, it activates the AFFC mechanism of the present invention. Traffic flows are classified. Elastic traffic is examined to determine if it is responsive to flow control signals. Flows of non-responsive elastic traffic is dropped. The remaining flows are compared to corresponding class baseline flow rates. Flows exceeding the baseline flow rates are subject to forced flow rate reductions, e.g., dropping of packets.

11 Claims, 10 Drawing Sheets

OTHER PUBLICATIONS

"Characterizing and Tracing Packet Floods Using Cisco Routers", downloaded from: wysiwyg://23/http://www.cisco.com/warp/public/707/22.html, 5 pgs.

"Cert® Advisory CA-1996-26 Denial-of-Service Attack via ping", downloaded from: http://www.cert.org/advisories/CA-1996-26.html, 4 pgs., last revised Dec. 5, 1997.

"Cert® Advisory CA-1996-21 TCP SYN Flooding and IP Spoofing Attacks", downloaded from: http://www.cert.org/advisories/CA-1996-21.html on Mar. 14, 2002, pp. 1-8, last revised Nov. 29, 2000.

S. Blake, D. Black, M. Carlson, E. Davies, Z. Wang, W. Weiss, "An Architecture for Differentiated Services", Network Working Group Request For Comments: 2475, downloaded from: ftp://ftp.isi.edu/in-notes/rfc2475.txt on Mar. 14, 2002, Dec. 1998, pp. 1-32.

L. Houvinen and J. Hursti, "Denial of Service Attacks: Teardrop and Land", Department of Computer Science Helsinki University of Technology, downloaded from: http://www.hut.fi/~ilhuovine/hacker/dos.html on Mar. 14, 2002, pp. 1-12.

SecurityFocus home mailing list: BugTraq "The "mstream" distributed denial of service attack tool", downloaded from: http://online.securityfocus.com/archive/1/57854 on Mar. 14, 2002, May 1, 2000, pp. 1-22.

Bellovin and Leech AT&T Labs Research, "ICMP Traceback Messages", Network Working Group Internet Draft, downloaded from: http://www.ietf.org/internet-drafts/draft-ietf-itrace-00.txt on Jul. 9, 2001, Mar. 2001, pp. 1-9.

S. Floyd and V. Paxson, "Why We Don't Know How To Simulate The Internet", AT&T Center for Internet Research, Oct. 11, 1999, pp. 1-13.

S. Floyd and K. Fall, "Promoting the Use of End-to-End Congestion Control in the Internet", May 3, 1999, pp. 1-16.

K. Thompson, G. J. Miller, and R. Wilder, "Wide-Area Internet Traffic Patterns and Characteristics", IEEE Network, Nov./Dec. 1997, pp. 10-23.

S. Floyd and V. Jacobson, "Link-sharing and Resource Management Models for Packet Networks", IEEE/ACM Transactions on Networking, vol. 3, No. 4, Aug. 1995, 22 pgs.

S. Floyd and V. Jacobson, "Random Early Detection Gateways for Congestion Avoidance", Lawrence Berkeley Laboratory University of California, 1993, pp. 1-22.

\* cited by examiner

FIGURE 4

Class Flow Baseline Table For Destination D2 — 400

| Protocol Type | TCP | | UDP | |
|---|---|---|---|---|
| Application Type | Web | FTP | Echo | DNS |
| Average Baseline (Arrival Rate bit/sec) | 1000 | 500 | 200 | 100 |
| | Class 1 — 402 | Class 2 — 404 | Class 3 — 406 | Class 4 — 408 |

FIGURE 6

Flow Statistics Before Processing — 600

| Traffic Type | Elastic | | | | | | | Best-Effort | |
|---|---|---|---|---|---|---|---|---|---|
| Protocol Type | TCP | | | | | | UDP | | |
| Application Type | Web | | | FTP | | Echo | | DNS | |
| Arrival Rate | 3500 | | | 1100 | | 780 | | 290 | |
| Flow (s) | F1 | F2 | F3 | F4 | F5 | F6 | F7 | F8 | F9 |
| Arrival Rate Per Flow | 800 | 1200 | 1500 | 700 | 400 | 180 | 500 | 200 | 90 |
| | Class 1 | | | Class 2 | | Class 3 | | Class 4 | |

FIGURE 7

Traffic Throughput After Processing — 700

| Traffic Type | Elastic | | | | | | | Best-Effort | |
|---|---|---|---|---|---|---|---|---|---|
| Protocol Type | TCP | | | | | | UDP | | |
| Application Type | Web | | | FTP | | Echo | | DNS | |
| Throughput (bit/sec) | 1800 | | | 400 | | 380 | | 200 | |
| Flow (s) | F1 | F2 | F3 | F4 | F5 | F6 | F7 | F8 | F9 |
| Responsiveness | YES | YES | NO | NO | YES | N/A | N/A | N/A | N/A |
| Aggressiveness | NO | YES | YES | YES | NO | NO | YES | YES | NO |
| Throughput | 800 | 1000 | 0 | 0 | 400 | 180 | 200 | 100 | 90 |
| | Class 1 | | | Class 2 | | Class 3 | | Class 4 | |

EARLY TRAFFIC REGULATION TECHNIQUES TO PROTECT AGAINST NETWORK FLOODING

FIELD OF THE INVENTION

The present invention is directed to communication systems, and more particularly, to flow control methods and apparatus suitable for use in network congestion control, especially when systems are under flooding Denial-of-service attacks.

BACKGROUND OF THE INVENTION

Data networks are used today to transmit vast amounts of data. Such networks comprise elements sometimes called nodes. Nodes may be, e.g., routers, switches, and/or end-hosts. Among those nodes, routers or switches are called network nodes. End-hosts can serve as the source or destination of data transmitted through a network. In many packet networks, data is transmitted between a source and destination device as a flow of packets. Flows of packets can be categorized by a wide range of factors including, e.g., the type of protocol used to form and/or transmit the packet and/or the specific type of application to which the packet corresponds.

As known in the art, it is common to monitor traffic flows and store flow statistics in a database, e.g., for purposes of load balancing and traffic route determination. Gathered traffic information for a node typically includes information such as packet flow rates and, for each flow, protocol type, application type, source IP address, source port number, destination IP address, destination port number, etc. Such detailed statistics along with information about the time periods in which such statistics are gathered can be used to group traffic flows into a wide number of classes depending on the intended purpose of grouping the traffic.

Flooding Network DoS (N-DoS) attacks occur in a network when one or more sources send large amounts of data to a destination node, e.g., web page server, in an attempt to interfere with the normal servicing of traffic at the destination node. Flows of traffic used to implement N-DoS attack can be considered malicious since their purpose is to interfere with the communication and servicing of legitimate network traffic.

Malicious flows associated with an flooding N-DoS attack often create congestion at certain nodes located prior to, i.e., upstream from, the flow's destination node. The nodes at which congestion occurs are sometimes referred to as bottleneck nodes.

As a result of malicious sources flooding a bottleneck node with traffic, legitimate traffic passing through the bottleneck node may be subject to dropping of packets thereby preventing legitimate communications. Thus, N-DoS attacks negatively effect legitimate users, and/or even cause its victim's services (e.g. web sites) to crash due to excessive loading.

One known technique for protecting against N-DoS attacks involves explicit signature capture and analysis. For example, those signatures can be communication port numbers, daemon names or commands, or contained in IP packet payload. Unfortunately these approaches can be ineffective and may result in negative consequences for legitimate users, because the signatures can change over time making a captured signature useless in identifying a malicious source during a subsequent attack.

Another disadvantage of the signature capture system is that the signature collection methods are an aftermath defense approach. Thus, such an approach helps in preventing future attacks with known signatures, but is of limited use during initial attacks.

In view of the above discussion, it is apparent that there is a need for methods of effectively identifying malicious traffic flows, e.g., traffic flows from individuals and/or sources involved in launching an N-DoS attack. There is also a need for methods and apparatus for reducing and/or eliminating the effects of malicious traffic flows associated with N-DoS attacks. It is desirable that at least some congestion control methods be capable of limiting malicious traffic prior to a significant collapse or restriction on legitimate network traffic occurs.

SUMMARY OF THE INVENTION

The present invention is directed to congestion control methods and apparatus. Various methods and apparatus of the invention are well suited for defending against flooding network Denial-of-Service (N-DoS) attacks.

An Anti-Flooding Flow-Control (AFFC) mechanism of the present invention monitors, analyzes, and regulates traffic flows at network nodes, e.g., routers, based on the flow's behavior. In a node, the AFFC mechanism of the invention, utilizes a traffic baseline generating module, a dynamic buffer manager module, a packet scheduler module, and optionally, an early traffic regulator (ETR) module. Each module may be implemented using software and/or hardware.

In some embodiments traffic baselines are generated external to a node using traffic information for the particular node. The generated baselines are then supplied to the dynamic buffer manager and packet scheduler in the node. In such embodiments, the traffic baseline module may be implemented as a stand-alone device separate from packet forwarding nodes. This can reduce the processing burden placed on such nodes by the AFFC methods of the invention.

While the AFFC mechanism can be implemented in a single node, for more effective network protection it can be implemented in multiple network nodes. AFFC modules, e.g., ETR modules, of different nodes may, and in various embodiments do, interact with one another to perform a multi-node approach to congestion control.

The traffic baseline generating module receives and analyzes traffic statistics to generate baseline flow statistics, e.g., diurnal flow statistics, for individual periods of time, e.g., hours or minutes of a day in a week. The traffic baselines are generated for each node based on the traffic through the node over an extended period of time, e.g., multiple weeks.

As part of the flow control method, the current data flow rates are compared to the corresponding baseline flow rate for the same period of time and type of traffic. Flows are determined to be aggressive if they have an arrival rate that is higher than the baseline for flow of its type. In accordance with the present invention, under certain circumstances aggressive flows are targeted for forced data rate reductions. In addition to aggressive flows, unresponsive elastic flows may be blocked independently of traffic baselines.

The dynamic buffer manager module 224 and packet scheduler module 226 are the mechanisms by which forced reductions in data flow rates are implemented at a node in response to the presence of congestion. In accordance with the invention the forced data flow reduction functionality of the buffer manager and packet scheduler normally remain inactive. However, when congestion is detected or a control message is received from another network node as part of the ETR method of the invention, the forced data flow reduction functionality in a node is activated. An ETR message triggering activation of the buffer manager and packet scheduler functionality may be received from, e.g., a downstream node confronting a potential collapse due to congestion.

The dynamic buffer manager module 224 of the invention determines packet dropping rates to be applied to different data flows, e.g., those flows identified as being allowable but aggressive. The packet scheduler module 226 determines current packet forwarding rates, e.g., flow rates.

During periods of congestion during which the forced data flow reduction is applied, incoming data flows are processed based on their traffic types, elastic traffic and best effort traffic. Elastic traffic, which is not responsive to congestion signaling, e.g., ECN (Explicit Congestion Notification) or packet dropping, is considered malicious and dropped.

Elastic traffic that is responsive to congestion signals is considered allowable.

For both elastic traffic and best-effort traffic, allowable traffic flows are determined to be aggressive if the flow rate of the allowable flow exceeds a corresponding baseline flow rate. Allowable non aggressive flows, e.g., flows having a flow rate equal to or lower than a corresponding baseline flow rate are forwarded without being subject to flow rate reduction. Allowable flows that are found to be aggressive, are subject to forced reductions in their flow rates during periods of congestion. The applied flow rate reduction may, e.g., reduce the flow rate of an aggressive flow, to or below the corresponding flow rate baseline.

To support different packet drop rates for each allowable aggressive flow, packets from different allowable aggressive flows are stored in different packet forwarding queues. e.g., one per allowable aggressive flow. In some embodiments, e.g., where sufficient memory is not available to support one queue per flow, a group of flows (e.g. from the same domain) may be processed per queue.

The dynamic buffer manager module 224 of the invention determines packet dropping rates to be applied to different data flows, e.g., those flows identified as being allowable but aggressive. The packet scheduler module 226 determines current packet forwarding rates, e.g., flow rates. As mentioned above, the current flow rates are compared to the baseline flow rates and packets are dropped, e.g., when the current flow rate exceeds the baseline flow rate. Accordingly, incoming flows are subject to different reductions in their flow rates as a function of their normal baselines and their current arrival rates. In the case of malicious traffic flows, such forced data rate reductions may be interpreted as punishing of the malicious flows.

ETR is a mechanism by which congestion control, and forced data rate reductions can be triggered in nodes upstream of a bottleneck node where the congestion occurs. ETR messages are used to activate flow reduction in the upstream nodes. Thus ETR offers protection for downstream nodes facing potential collapse due to congestion by reducing the flow of traffic directed to the node suffering from congestion.

Numerous additional features and advantages of the invention are discussed in the detailed description which follows.

BRIEF DESCRIPTION OF THE DRAWINGS

FIG. 4 illustrates an exemplary flow baseline table generated and used in accordance with an embodiment of the present invention.

FIG. 6 illustrates an exemplary set of internet traffic statistics measured right during a period of potential congestion collapse at a bottleneck node.

FIG. 7 illustrates an exemplary set of router throughput statistics resulting from the AFFC method of the invention being applied at a bottleneck node to the flows listed in FIG. 6.

DETAILED DESCRIPTION

The present invention is directed to congestion control methods and apparatus. The methods and apparatus of the present invention are well suited for defending against network Denial-of-Service (N-DoS) attacks.

Figure 1:
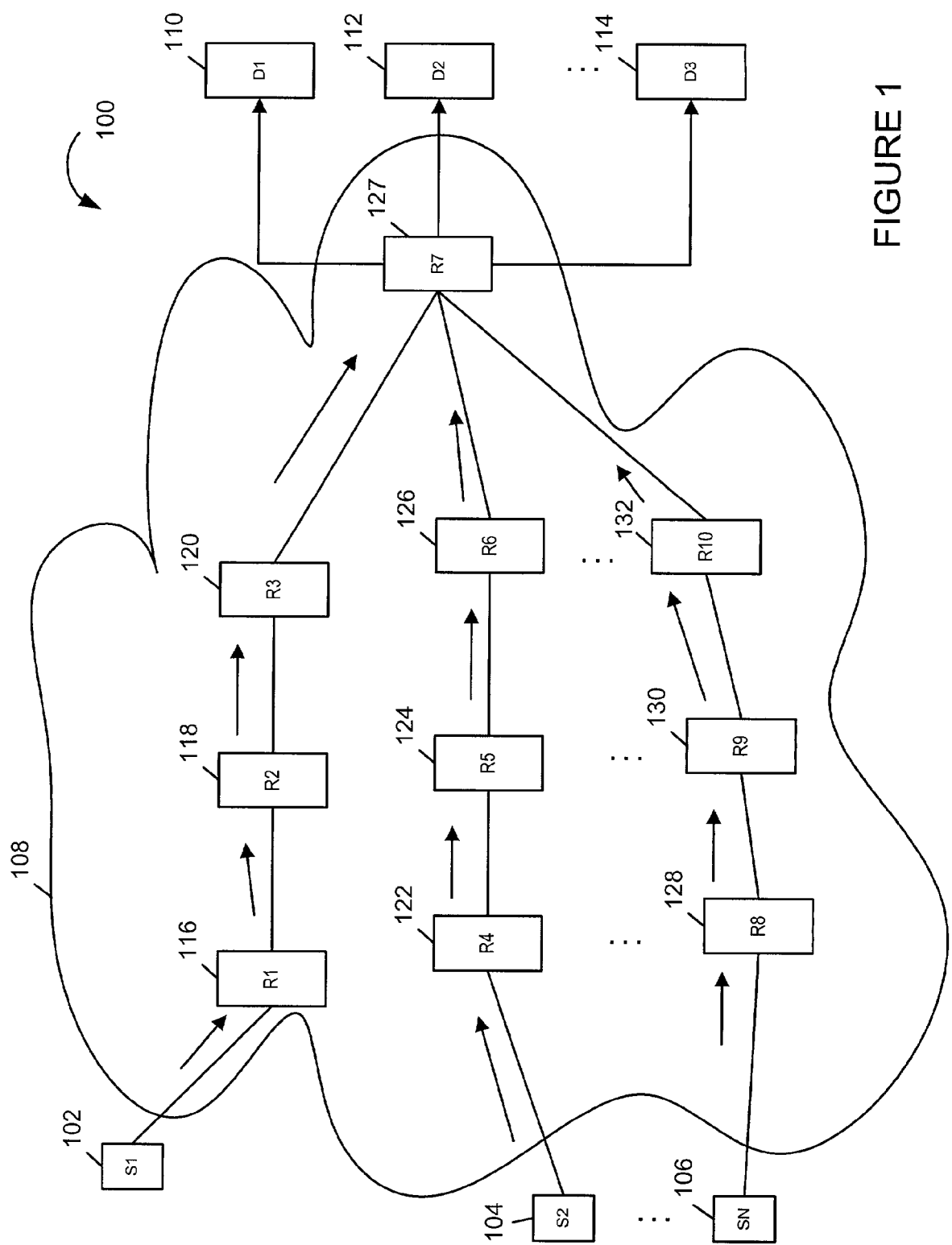
FIG. 1 illustrates a communications system incorporating nodes that implement the present invention.

FIG. 1 illustrates a communications system 100 implemented in accordance with the present invention. The system 100 comprises a plurality of sources 102, 104, 106, an internet 108 and a plurality of destination nodes 110, 112, 114. The internet 108 may be a corporate internet or the world wide Internet. The internet 108 comprises a plurality of nodes R1 through R10 116, 118, 120, 122, 124, 126, 127, 128, 130, 132 connected together as shown in FIG. 1 by the use of solid lines. Each of the nodes may be, e.g., a router or a switch. Arrows are used in FIG. 1 to indicate the flow of packets, e.g., between source devices S1, S2, . . . , SN, 102, 104, 106 and destination device 112. While FIG. 1 shows flows of packets to destination device D2 112 from sources S1, S2, . . . , SN, 102, 104, 106 the communications paths in the system 100 between the routers and devices are bi-directional allowing for responses, e.g., packets and messages, to be transmitted in the reverse direction as well. In the FIG. 1 embodiment source S1 102 is coupled to the internet 108 by router R1 116. In addition, source S2 is coupled to the internet 108 by router R4 122, while source SN 106 is coupled to the internet 108 by router R8 128. Router R7 127 couples each of the three destination devices, D1 110, D2 112, and D3 114, to the internet 108. As a result packets from any one of the sources 102, 104, 106 will pass through router R7 prior to reaching one of the destination devices 110, 112, 114.

Since traffic directed to a destination device, e.g., device D2 112, will pass through the router R7 127 regardless of the source of the traffic, router R7 127 represents a potential congestion point. For purposes of explaining the invention, router R7 127 will be referred to as a "bottleneck" node since it is the point in system 100 where traffic bottlenecks may occur when excessive amounts of traffic are directed to one of the destination devices D1, D2, D3 110, 112, 114. Relative to the bottleneck node 127, system elements, e.g., routers and sources located to the left of bottleneck node 127, are upstream nodes. System elements, e.g., devices D1, D2, D3 110, 112, 114 to the right of the bottleneck node 127, are downstream nodes since they follow bottleneck node 127 in terms of the exemplary traffic flows shown in FIG. 1.

A flooding N-DoS attack works by transmitting a large amount of traffic from one or more sources to a particular destination, e.g., a web page server, which is the target of the N-DoS attack. For purposes of explaining the invention, when discussing an exemplary N-DoS attack it will be assumed that destination device D2 112 is the target of the exemplary attack. The exemplary N-DoS attack will result in bottleneck node 127 being flooded with useless information, corresponding to malicious data flows associated with the N-DoS attack.

Figure 2:
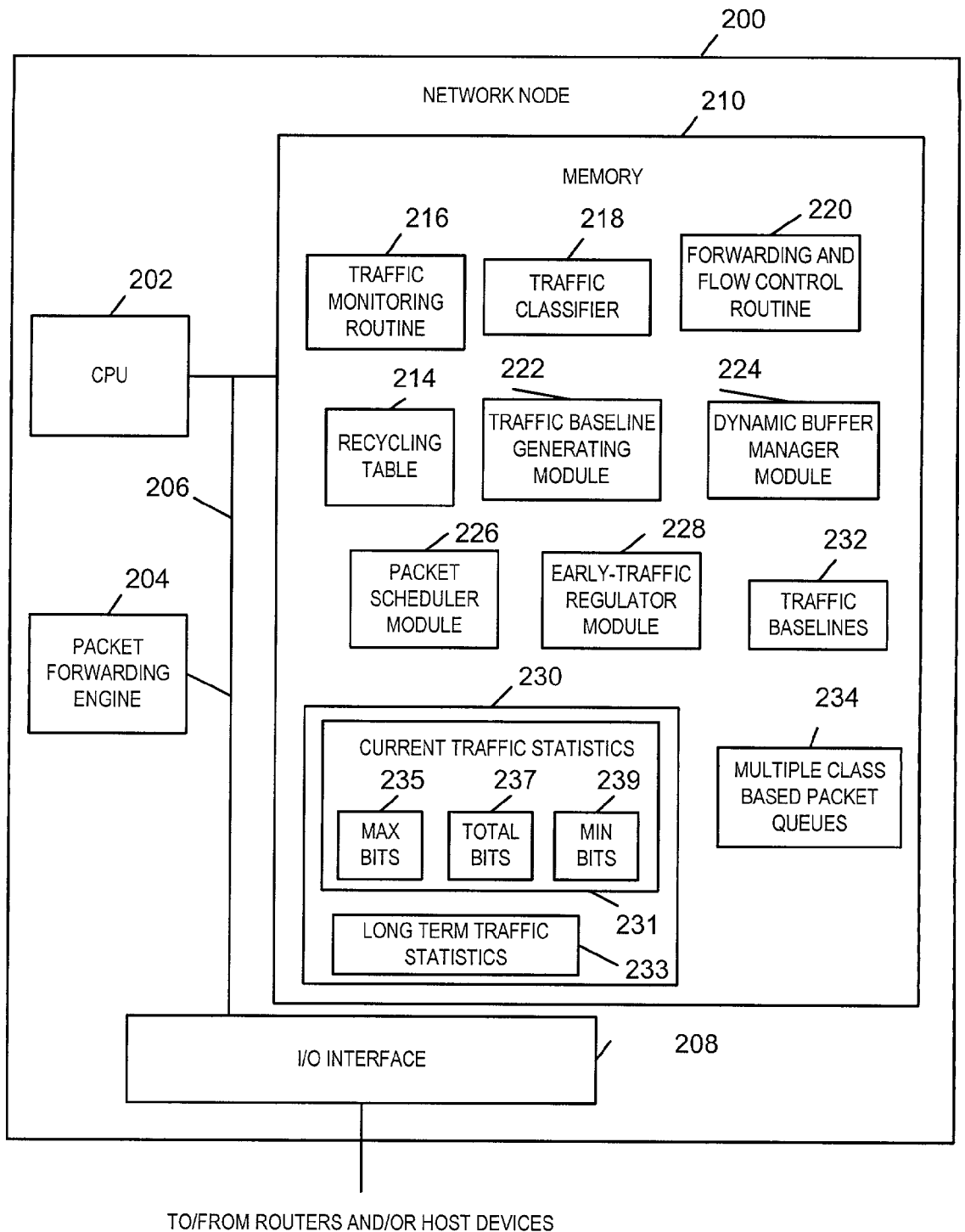
FIG. 2 illustrates an exemplary router implemented in accordance with the present invention that may be used as one of the routers shown in FIG. 1.

FIG. 2 illustrates an exemplary router 200 implemented according to one embodiment of the present invention. The router 200 may be used as, any one of the routers shown in FIG. 1 including edge router 127 which serves for discussion purposes as the exemplary bottleneck node. Router 200 comprises of a CPU 202, a packet forwarding engine 204, an I/O interface 208 and a memory 210. These elements are coupled together by bus 206.

The CPU 202 controls operation of the router 200 under direction of various routines stored in memory 210. The packet forwarding engine 204 is responsible for controlling the forwarding of packets under direction of various routines executed by the CPU 202. As part of the forwarding process packet forwarding engine 204 may store received packets corresponding to different flows and/or classes in different queues. In accordance with the congestion control mechanisms of the present invention some received packets may be dropped by the packet forwarding engine, e.g., when the router 200 is incapable of forwarding packets at the rate at which they are received. The I/O interface 208 couples the router to other routers and/or host devices, e.g., source and/or destination devices. Thus, via I/O interface 208 the router 200 receives and transmits packets.

Memory 210 includes a traffic monitoring routine 216, traffic classifier 218, forwarding and flow control routine 220, traffic baseline generating module 222, dynamic buffer manage module 224, packet schedule module 226, early traffic regulator (ETR) module 228, traffic statistics 230, traffic baselines 232, a Recycling table 214, and a plurality of class based packet queues 234. The traffic statistics 230 include current traffic statistics 231 and long term, e.g., weekly traffic statistics 233. The various modules 222, 224, 226, 228 may be implemented as, e.g., software routines. Alternatively, the modules could be implemented in hardware, e.g., in the router 200, to enhance processing speed.

The traffic monitoring routine 216 monitors to detect when the rate at which packets are received exceeds the maximum forwarding packet rate of the router 200 for a period of time corresponding to the buffering capacity of the router 200. This condition corresponds to saturation at the router 200 necessitating the dropping of some received packets. The traffic monitoring routine 216 notifies the forwarding and flow control routine 220 when saturation occurs and the length of the period of saturation.

The traffic classifier 218 is used to classify packets into different classes and/or flows of traffic based on such factors as source address, destination address, protocol type, and application type. The application type is determined from the port number or message type information included in a packet. The level, e.g., resolution, of traffic classification applied by the classifier 218 may depend on the application for which the classifier is being used. The traffic classifier can be called by the traffic baseline generating module 222 and/or the forwarding and flow control routine 220 during normal operation.

Forwarding and flow control routine 220 is responsible for controlling the forwarding and flow control of packets in accordance with the present invention. The forwarding and flow control routine 220 is responsible for activating the dynamic buffer manager module 224, packet scheduler module 226 and early traffic regulator module 228 used to implemented forced reductions in flow data rates in accordance with the present invention when the router 200 is saturated by packet traffic, e.g., for a preselected period of time. By limiting implementation of all or some of the flow reduction features of the present invention until saturation of a node has occurred for a period of time, application of the anti-flooding flow reduction techniques can be limited to cases where flooding is likely to be occurring or to cases where a traffic collapse at the node is likely to occur if steps are not taken to avoid the collapse. In addition, false alarms of which can be induced by occasional short-term traffic spikes can be reduced or eliminated.

Traffic baseline generating module 222 operates in parallel with the forwarding and flow control routine 220 to generate traffic baselines for various traffic flows at preselected intervals. As will be discussed below, the traffic baselines 232 are generated from the traffic statistics 230 which are produced over an extend period of time, e.g., days or weeks. Traffic baselines 232 are stored in memory for use in forced traffic flow reduction operations implemented in the router 200 in accordance with the invention.

The dynamic buffer manager module 224 and packet scheduler module 226 implement in accordance with the invention are responsible for performing forced reductions in the rate of packet flows through the router 200. The amount of the flow reduction applied to individual flows or flow groups is determined as a function of the traffic baselines 232.

Early traffic regulator module 228 is used to send early traffic regulation (ETR) signals, e.g., messages, to upstream nodes to trigger the congestion control and forced packet flow reductions techniques of the present invention to be implemented in the upstream node. In the case of a node receiving an ETR message, the ETR module 228 is responsible for responding to the ETR message by implementing forced packet flow rate reductions. In some embodiments the forced packet flow rate reductions in response to an ETR message are on flows directed to the node which was the source of the ETR message while in other embodiments, the forced packet flow rate reductions are limited to flows destined for target IP address(es) identified in the received ETR message.

Figure 3:
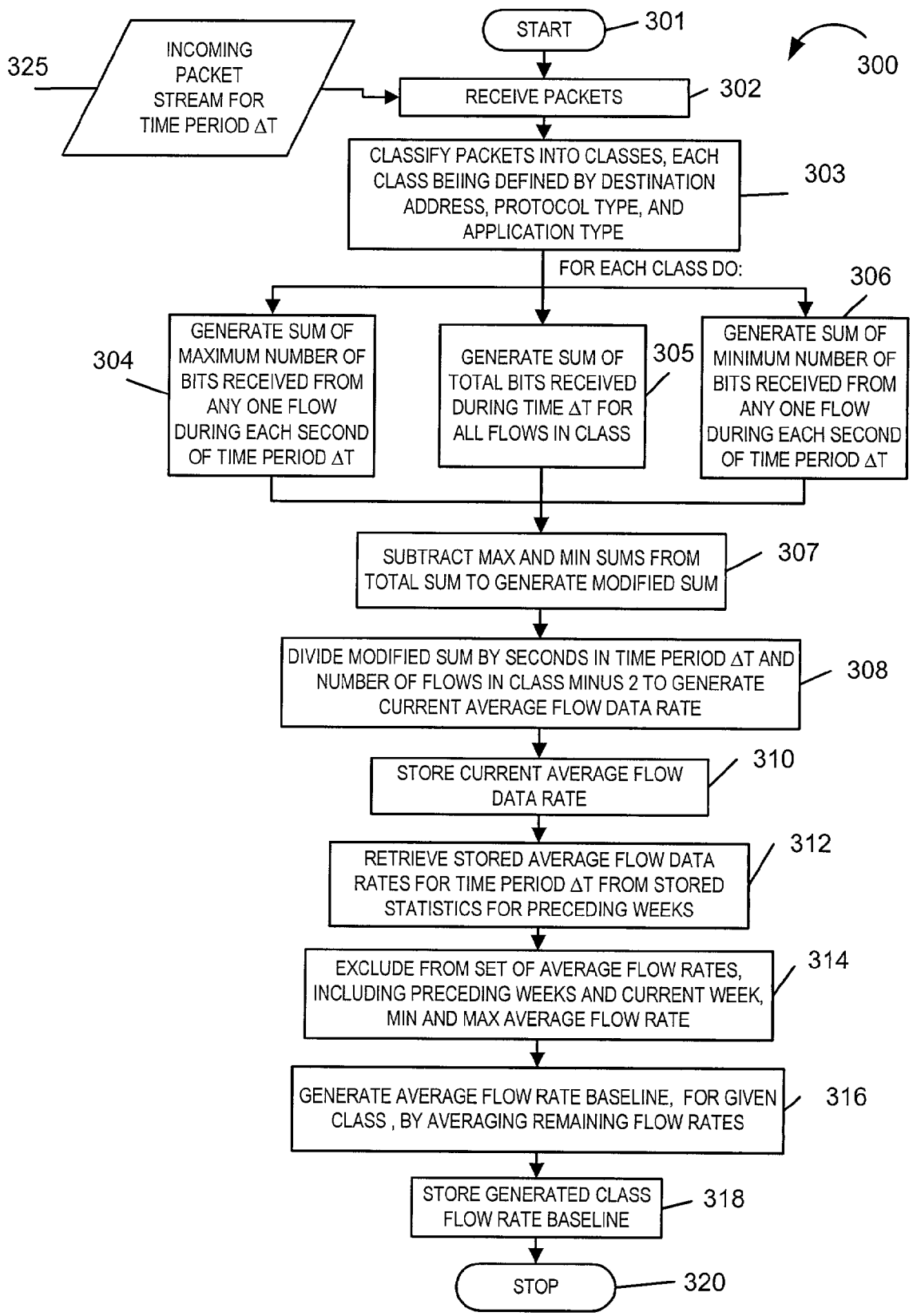
FIG. 3 illustrates the steps of an exemplary traffic baseline generation routine of the invention.

An exemplary traffic baseline generating routine 300, which can be used as the traffic base line generating module 222, is shown in FIG. 3.

Traffic baseline generation involves removing spikes in a time window corresponding to a daily period of time and removing short-term abnormal traffic patterns which may be encountered over a period of weeks. Furthermore, depending on the implementation, traffic classification for baseline generation purposes need not be limited to simply protocol types and IP addresses but may also be based on the application type and/or port numbers associated with packets.

The routine 300 starts in step 301 wherein the routine is executed by the CPU 202. Then in step 302, packets 325 for a current time period ΔT are received. The time period ΔT may be fixed or any desired length depending on the environment and specific traffic patterns and/or day and time of week for which the flow rate baseline is being generated. The packets 325 correspond to multiple destination addresses and sources. Accordingly, many flows of traffic are represented in the received packet stream 325. Each packet includes source IP addresses, destination IP addresses, protocol type information, port number and/or message type information. As discussed above, port number and/or message type information can be used to identify an application to which the packet corresponds. ΔT in the exemplary embodiment is a time segment, e.g., 30 minute time segment, from a 24 hour time period. ΔT can be either constant through the day, e.g., 30 minutes, or vary at different time of the day, e.g., 120 minutes from 2 A.M. to 4 A.M. vs. 30 minutes for other busier times of the day. Holidays may be treated as special cases for purposes of data collection and baseline generation if desired, e.g., due to very different traffic patterns on those days.

In step 303, each packet is classified based on destination address, protocol type and application type. The resulting sets of data correspond to individual classes of traffic.

Some exemplary protocol types are TCP and UDP, while some exemplary applications that use TCP are web traffic and FTP traffic. An exemplary application that uses UDP is Echo traffic. Accordingly, the first exemplary traffic class might include TCP packets for an FTP application directed to a first destination. A second exemplary traffic class might include TCP packets for a web application directed to the same destination. Numerous other traffic classes are possible with the granularity of the class being a matter of design choice.

Each class will normally include multiple flows with the number of bits received in each flow varying as a function of time. The number of bits received in each second by each flow in a class is used in steps 304, 305, and 306, which operate in parallel.

In step 304, a sum of the maximum number of bits received from any one flow during each second of time period ΔT is generated. The running maximum sum, tends to be larger than the number of bits received in any one of the flows since it may be generated from values obtained from different flows.

In step 305, a sum of the total bits received by the node for all the flows in the class being processed during time ΔT is generated.

In step 306, a sum of the minimum number of bits received from any one flow during each second of time period ΔT is generated. This running minimum sum tends to be smaller than the minimum number of bits received in any one of the flows since it may be generated from values obtained from different flows.

The running sums of max, min and total bits received are stored in memory elements 235, 237, 239 during processing.

Once the maximum, total, and minimum number of bits are determined for time period ΔT in steps 304, 305, 306 operation proceeds to step 307. In step 307, the max and min sums are subtracted from the total number of bits to generate a smoothed total sum.

In step 308, the smoothed total sum is divided by the number of seconds in the time period ΔT and the number of flows in the class being processed minus 2. The subtraction of 2 from the total number of flows represents the elimination of bits corresponding to the composite min and max data flows used to reduce the impact of transient or abnormal flow characteristics. The result of the division operation is a smoothed average value, the current average flow data rate.

The current average flow data rate is then stored in step 310 thereby updating the set of long term, e.g., multi-week, traffic statistics 233.

The traffic baseline generating method 300 continues in step 312 by retrieving stored average flow data rates for the corresponding time periods ΔT generated from statistics 233 for the preceding weeks. For example, average flow rates may be retrieved in step 312 from the long term traffic statistics 233 for the four weeks preceding the current time period.

Once again, to reduce the risk of flow rate anomalies having a large impact on a class baseline, in step 314, the minimum and maximum average flow rates, from the set of average flow rates including the average flow rates for the preceding weeks and the current week, are excluded from the set of data used for generating the class flow rate baseline. Assuming the flow rates for 4 preceding weeks were retrieved in step 312, excluding the minimum and maximum average weekly rates will result in 3 average weekly flow rates remaining for the traffic class being processed.

In step 316 the flow rate baseline for the class of traffic being processed is generated by averaging the remaining average weekly flow rates. Next, in step 318 the generated flow rate baseline for the traffic class being processed is stored, e.g., in the set of baseline statistics 232. The most recent class flow baseline for a particular time period may replace a previously generated baseline for the same time period thereby ensuring that the set of traffic baselines 232 includes the most recently generated baseline flow rates for the various classes of traffic and time periods of interest.

In the above described manner, flow rate baselines are generated for a class based on packet arrival rates. Alternatively, such baselines could be generated from other flow statistics, e.g., packet forwarding rates.

After flow rate baselines are generated for each class of traffic for which flow rate information is received, the flow rate baseline generation process stops in step 320 pending receipt of another set of flow packets for processing in the next time period ΔT'.

While baselines are described as being generated in the above described manner for classes defined by destination address, protocol type, and application type, classes may be defined with less granularity, e.g., without considering application type or port number. In such cases, flow rate baselines for the classes can be generated by applying steps 304, through 318 to the traffic corresponding to each class as defined for the particular application.

FIG. 4 illustrates an exemplary flow baseline table 400 for a single destination address. The traffic baselines 232 include information of the type shown in FIG. 4, for each destination address of interest, e.g., each downstream web server likely to be the target of a N-Dos attack.

The table 400 includes base lines for four different classes of packet traffic corresponding to a single destination address D2. In FIG. 4, each column 402, 404, 406, 408 corresponds to a different traffic class as defined, for the given destination address, by the protocol type (TCP or UDP) and application type (Web, FTP, Echo, or DNS), as determined by port number and/or message type. The second from the last line of the table 400 indicates the baseline flow rate for each class. Directly below each baseline flow rate is listed the class to which it applies.

In the FIG. 4 example, class 1 which corresponds to Web traffic has a baseline flow rate of 1000 bits/s per flow. Class 2 which corresponds to FTP traffic has a baseline flow rate of 500 bits/s. In addition class 3 which corresponds to Echo traffic has a baseline flow rate of 200 bits/s while class 4 which corresponds to DNS traffic has a baseline flow rate of 100 bits/sec.

Figure 5:
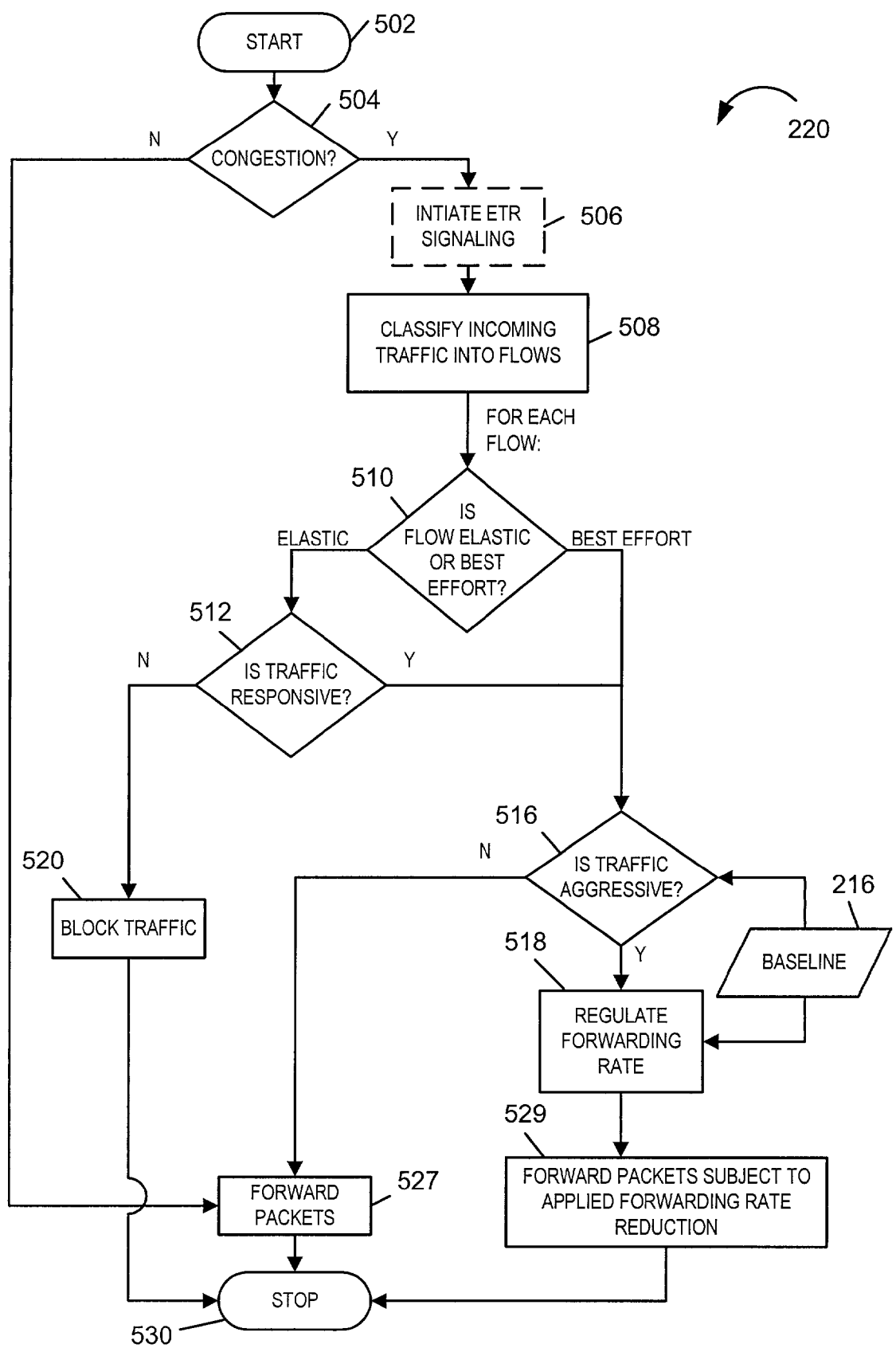
FIG. 5 illustrates the steps of an Anti-Flooding Flow-Control (AFFC) method implemented in accordance with an exemplary embodiment of the present invention.

The packet forwarding and flow rate control routine of the present invention will now be described with reference to FIG. 5. FIG. 5 illustrates an exemplary forwarding and flow rate control routine.

The routine 220 begins in step 502 when the router which includes the routine is activated and the routine is executed. Once the routine 220 is activated, control step 504 is performed on an ongoing basis. Control step 504 involves making a determination as to whether the router is currently experiencing congestion sufficient to merit the application of the AFFC mechanisms supported by the dynamic buffer manager module 224, packet scheduler module 226 and, optionally, the early traffic regulator module 228. In step 504, congestion sufficient to merit application of the AFFC flow control mechanisms is declared when the router encounters a saturation condition which persists for a pre-selected period of time, e.g., a period of time indicative of persistent and potentially hostile volumes of traffic.

In one particular embodiment, the congestion decision of step 504 is made based on two conditions to reduce false positives, the first condition is that the summation of total bandwidth shares at the node must saturate the node and second, the saturation condition must persist for a window period after the saturation condition initially occurs. In such an embodiment, congestion is declared in step 504 when the two conditions are met. Congestion is no longer found to be present when the saturation condition ceases to be encountered for the set period of time in which it was required to occur before congestion was declared.

When control step 504 determines that congestion does not exist, operation proceeds directly to step 527 with the received packets being forwarded without being subject to processing in accordance with the invention to reduce the flow rates of specific identified traffic flows.

However, when control step 504 detects the presence of congestion, e.g., the two conditions above are satisfied, traffic is processed along the path which proceeds to step 508 via optional step 506.

In optional step 506, ETR signaling is initiated. Such signaling will, as discussed below, trigger traffic regulation and flow control to be applied at an upstream node thereby reducing the traffic burden on the current node. When ETR is not used traffic flow processing proceeds directly from step 504 to step 508.

In step 508, the traffic classifier 218 is used to classify the individual incoming traffic flows to corresponding classes. The classes correspond to either elastic traffic, e.g., TCP traffic, or best effort traffic, e.g., UDP traffic. Processing then proceeds to step 510 which represents a fork for the processing of flows falling into either elastic or best effort classes.

Individual elastic flows, e.g., TCP flows, proceed from processing fork 510 to step 512 wherein each individual elastic flow is analyzed to determine if it is responsive to congestion signals, e.g., ECN or packet dropping.

Due to the congestion control avoidance scheme implemented in elastic protocol such as TCP, elastic traffic will normally decrease its packet send rate in response to congestion signals. This responsiveness will be reflected, and can be detected, by a decrease in the arrival rate of packets from the source at the nodes through which the traffic flows.

In the case of N-Dos attacks, due to the use of spoofed IP addresses, some malicious sources may not respond to congestion signals. Other malicious sources without IP-spoofing may intentionally ignore congestion signals despite an ever increasing number of dropped packets. Such traffic flows are identified in step 512 as non-responsive, e.g., from their arrival rates which are higher than expected decreasing rate.

In one exemplary embodiment detection of responsiveness of a flow is derived from a specific TCP-friendly-traffic behavior, which is bound to a definite end-to-end congestion control and avoidance scheme—

$$T \le \frac{1.5\sqrt{2/3} * B}{R * \sqrt{p}};$$

where T is the maximum sending rate, B is the number of packet sent, R is the round-trip-time, and p is the packet dropping-rate.

In the exemplary embodiment the above behavior is checked in step 512 by measuring the relationship of packet-dropping rate p and packet arrival rate T. In the case of responsive TCP traffic when a packet dropping rate increases to a factor of $\sqrt{x}$, the packet arrival rates should decrease by a factor of $a*\sqrt{x}$; where a is an adjusting argument in considering link saturation situation and where a is usually $a \le 1$. Failure to detect the expected decrease in packet arrival rates results in a determination that a flow is non-responsive.

The recycling table 214 is used to record responsive elastic flow information for each class. The information includes data such as <source IP address>, <time-stamp>. Oldest flow records may be replaced by the newest record when the table is full. The table size may be restricted the amount of memory the network node can afford to allocate to this use. The responsiveness of an elastic flow in the table may be checked every time the next packet of the same flow arrives.

Processing of non-responsive flows proceeds from step 512 to step 520 wherein the non-responsive flows are blocked. The processing of the received packets corresponding to a non-responsive flow then stops in step 530.

If in step 512, an elastic traffic flow is determined to be responsive to congestion signaling, the flow is considered allowable and flow processing operation proceeds to step 516.

Best effort traffic is not expected to vary its data rate in response to the dropping of packets. For this reason, best effort traffic is not analyzed for responsiveness and is considered to be allowable traffic. Accordingly, for flows determined to correspond to best effort traffic, operation proceeds directly from step 510 to step 516.

Each of the allowable traffic flows or flow-groups is compared to the corresponding baseline for a flow of the same class and time, e.g., as indicated by the time and day of the week.

Allowable flows, i.e., best effort and responsive elastic traffic flows, having a flow rate equal to, or less than the corresponding baseline flow rate to which they are compared, are categorized as non-aggressive. Processing of non-aggressive flows proceeds to step 527 wherein the packets are forwarded.

However, allowable flows which have current flow rates exceeding the corresponding baseline flow rates are categorized as aggressive and identified for forced reductions in their flow rates. Processing of aggressive allowable flows proceeds from step 516 to step 518 wherein the forwarding rates of the aggressive flows are regulated, e.g., by dropping packets from the aggressive flows.

Figure 8:
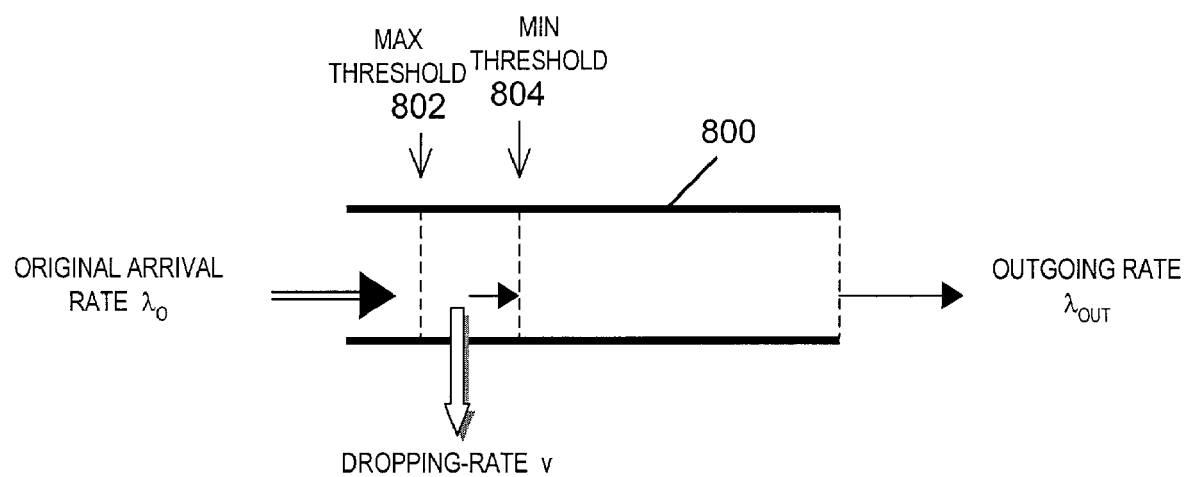
FIG. 8 illustrates the dropping of packets from a queue in accordance with the invention.

In step 518, the packet forwarding rates of each aggressive flow is regulated separately as a function of the flow's determined current flow rate and the corresponding baseline flow rate. Forced reduction in a flow's forwarding rate is implemented by adjusting the maximum threshold 802 of the queue 800 of a flow or flow group as shown in FIG. 8. The forced flow forwarding rate reduction is achieved, in one embodiment of the invention, by dropping the required number of received packets from the aggressive flows packet forwarding queue. The drop rate, e.g., penalization severity, for each aggressive flow is affected by the packet arrival rate of the flow. The higher the packet arrival rate of the flow above the baseline flow rate, the higher the applied packet drop rate will be.

FIG. 8 illustrates a flow rate reduction technique which can be applied in step 518 to allowable aggressive flows in accordance with the invention to control packet drop rates as applied to a packet queue 800. As discussed above the packets corresponding to individual aggressive flows are stored in different packet queues. In FIG. 8 an exemplary flow rate reduction technique uses two different thresholds, which are queue fullness thresholds to control packet drop rates, a min threshold 804 and max threshold 802.

In the FIG. 8 example, the packet dropping-rate v is affected by the packet forwarding-rate $\lambda_{out}$, which in turn is bound to the class baselines.

The relationship of the packet dropping rate and the maximum threshold is presented in Formula 1.

$$\text{new max Thresh}(t) = \frac{[x(t)-1]*\text{min Thresh}(t-\Delta t) + \text{max Thresh}(t-\Delta t)}{x(t)} \quad (1)$$

Where the x(t) is the change factor of packet dropping rate v(t) within time frame $\Delta t$:

$$x(t) = \frac{v(t)}{v(t-\Delta t)}.$$

In step 518, the forwarding rates are regulated by a penalty factor k, which may be preset, e.g., to two—

$$\lambda(t) = \frac{\lambda(t-\Delta t)}{k}.$$

This calculation can be implemented using a shift operation with little cost. In the above equation $\lambda(t)$ is the packet forwarding rate at time (t) while $\lambda(t-\Delta t)$ is the forwarding rate at time $(t-\Delta t)$.

After flow rate reduction is applied to the aggressive traffic flows, the remaining packets are forwarded in step 529. Processing of a set of received packets then steps in step 530.

Thus, in accordance with the present invention, packets corresponding to elastic non-responsive traffic will be blocked, i.e., it will not be forwarded. In addition, packets corresponding to elastic responsive flows and best effort flows will be passed subject to forced reductions in their flow rates when the flows exceed the baseline flow rates for flows of the same class of traffic.

Notably, in accordance with the invention the more aggressive the traffic flow, the greater the applied reduction in flow forwarding rate. Accordingly, while flows having flow rates within the normal baseline will be forwarded with less constraint during periods of congestion, flows with higher flow rates will be subjected to higher forwarding rate reduction. Thus, the flows corresponding to a N-DoS attack are more likely to be penalized do to their distinct traffic behavior which differs from that of legitimate normal flows.

FIG. 6 illustrates a set of flow statistics corresponding to nine different flows (F1 through F9) received by a node implementing the AFFC mechanism of the present invention. The nine flows correspond to four classes Class 1 through Class 4. For purposes of explaining the invention, it will be assumed that the baselines shown in FIG. 4 represent the current flow rate baselines for the four classes.

FIG. 7 illustrates the exemplary results of applying the flow control methods of the invention to the nine flows illustrated in FIG. 6. The second from last row of FIG. 7 shows the flow throughputs for each of the nine flows after AFFC processing. Notice that if the congestion still continues, the AFFC flow regulation will continue with the penalty ratio k on flow forwarding rates—

$$\lambda(t) = \frac{\lambda(t-\Delta t)}{k}.$$

In the case where the node is still saturated after application of the flow reduction techniques of the invention, additional packets may be dropped until the total volume of the flows equals the node's forwarding capacity. The dropping of such additional packets occurs in forwarding step 527 when necessary.

Flows F1 through F3 correspond to Class 1 traffic, i.e., TCP/Web traffic directed to destination D2. From FIG. 4 it can be seen that the baseline flow rate for Class 1 traffic in the example is 1000 bits/s.

Flow F1 is found to be elastic responsive traffic having a flow arrival rate (800 bits/s) which is less than the baseline flow rate (1000 bits/s) for class 1 traffic. Accordingly, no reduction is applied to the forwarding rate of flow F1.

Flow F2 is found to be elastic responsive traffic having a received flow rate (1200 bits/s) which is higher than the baseline flow rate (1000 bits/s) for class 1 traffic. Accordingly, forced flow rate reduction, e.g., dropping of packets, is applied to flow F2 to reduce its forwarding flow rate to the baseline of 1000 bits/s.

Flow F3 is found to be elastic non-responsive traffic. Accordingly, the packets of Flow F3 are dropped, i.e., they are not forward.

Flows F4 and F5 correspond to Class 2 traffic, i.e., TCP/FTP traffic directed to destination D2. From FIG. 4 it can be seen that the baseline flow rate for Class 2 traffic in the example is 500 bits/s.

Flow F4 is found to be elastic non-responsive traffic. Accordingly, the packets of Flow F4 are dropped, i.e., they are not forward.

Flow F5 is found to be elastic responsive traffic having a received flow rate (400 bits/s) which is lower than the applicable baseline flow rate (500 bits/s) for class 2 traffic. Accordingly, no reduction is applied to the flow rate of flow F5.

Flows F6 thorough F9 correspond to best effort traffic, which does not have congestion control/avoidance scheme implemented in the protocol. Accordingly, responsiveness to congestion signals is not an issue with regard to these flows. Flows F6 and F7 correspond to Class 3 traffic, i.e., UDP/Echo traffic directed to destination D2. From FIG. 4 it can be seen that the baseline flow rate for Class 3 traffic in the example is 200 bits/sec. Flows F8 and F9 correspond to Class 4 traffic, i.e., UDP/DNS traffic directed to destination D2. From FIG. 4 it can be seen that the baseline flow rate for Class 4 traffic in the example is 100 bits/sec.

Flow F6 is found to be best effort traffic having a received flow rate (180 bits/s) which is lower than the applicable baseline flow rate (200 bits/s) for class 3 traffic. Accordingly, no reduction is applied to the flow rate of flow F6.

Flow F7 is found to be best effort traffic having an arrival rate (500 bits/s) which is higher than the baseline flow rate (200 bits/s) for class 3 traffic. Accordingly, forced flow rate reduction, e.g., dropping of packets, is applied to flow F7 to reduce its flow rate to the baseline flow rate of 200 bits/s.

Flow F8 is found to be best effort traffic having an arrival rate (200 bits/s) which is higher than the baseline flow rate (100 bits/s) for class 4 traffic. Accordingly, forced flow rate reduction, e.g., dropping of packets, is applied to flow F8 to reduce its flow rate to the applicable baseline flow rate of 100 bits/s.

Flow F9 is found to be best effort traffic having an arrival rate (90 bits/s) which is lower than the applicable baseline flow rate (100 bits/s) for class 4 traffic. Accordingly, no reduction is applied to the flow rate of flow F9.

Altogether, in the FIG. 7 example 2890 out of 5670 bits of data were dropped. The benefits of the AFFC method can be seen from this example.

As will now be discussed further benefits can be obtained by implementing Early Traffic Regulation (ETR) in accordance with the invention.

The ultimate purpose of ETR is to regulate flows which are responsible for congestion upstream of the node, e.g., a bottleneck node, where congestion is detected. By providing congestion control upstream of the point of congestion, greater protection against a collapse at the bottleneck due to congestion is provided than when congestion control is implemented solely at the bottleneck node.

Figure 9:
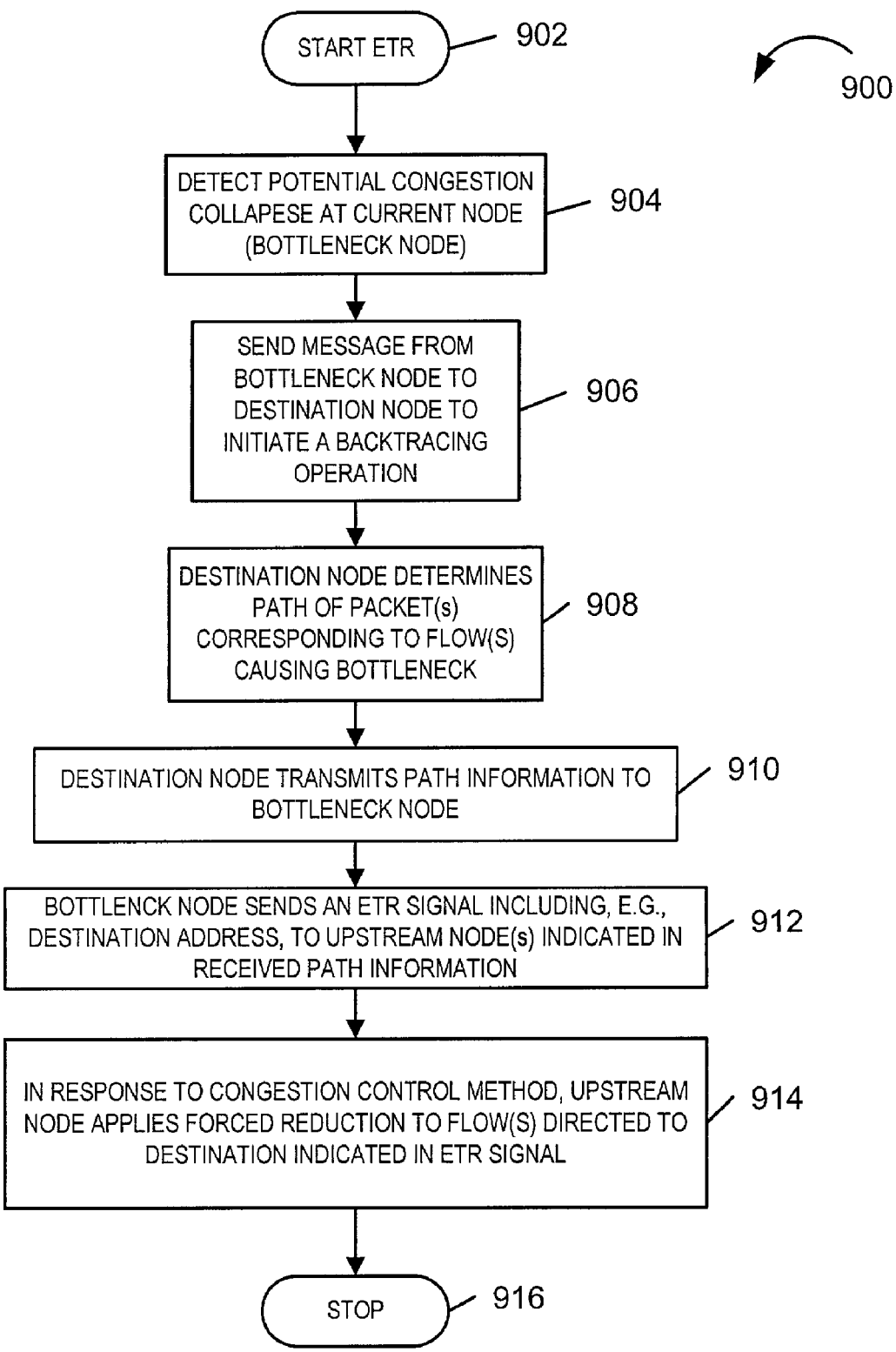
FIG. 9 illustrates an early traffic regulation method of the invention.

FIG. 9 illustrates the steps of the ETR method 900 of the present invention. The ETR method begins in step 902 with the execution of the ETR modules 228 in a plurality of network nodes including a destination node, bottleneck node and a node upstream of the point of congestion, e.g., the bottleneck node.

For purposes of explaining the ETR method of the present invention, consider the system of FIG. 1 in which the method 900 may be implemented. It will be assumed for purposes of explanation that destination device D1 110, node R7 127, and node R3 120 each include and implement the ETR module 228 of the present invention or at least a subset of the components thereof as will be discussed further below. It will also be assumed that source device S1 102 is one of a plurality of source devices being used to flood device D1 110 with traffic. It will further be assumed that the flooding causes congestion at node R7 127, the bottleneck node thereby saturating the node for an extended period of time sufficient to trigger ETR. From FIG. 1 it can be seen that node R3 is an upstream node relative to bottleneck node R7 127 on the path leading between source S1 102 and destination device D2.

Referring once again to the ETR method shown in FIG. 9, operation proceeds to step 904, wherein a node, e.g., the bottleneck node 127, detects congestion sufficient to trigger the ETR signaling to initiate flow control at an upstream node.

In response to detecting congestion at the bottleneck node 127 in step 904, operation proceeds to step 906 wherein the bottleneck node 127 sends a message to the destination node 110. The destination node 110 is the node to which one or more of the packet flows that are causing the congestion, e.g., the non-responsive TCP flows and/or the aggressive allowable flows, are directed.

The receipt of the ETR message causes, in step 908, the destination node 110 to initiate a path back-tracing operation and to determine from a back-tracing operation the path of the packet flow or flows causing the congestion. The back tracing is performed using any one of a plurality of known techniques, which will not be discussed in any detail.

With the path of the flow or flows causing the congestion determined, in step 910 the destination node 110 sends the determined path information to the bottleneck node 127.

The path information obtained from the destination node 110 is used by the bottleneck node 127 in step 912. In step 912, the bottleneck node 127 sends an ETR signal, e.g., control message, to the upstream node 120 using the supplied path information. The ETR control message indicates whether flow control is to be applied (started) or discontinued (stopped) and includes information such as victims', e.g., targeted destination device IP address(es).

In step 914, in response to the ETR control message, the upstream node 120 implements flow rate control on the flow or flows identified in the ETR signaling message, e.g., the flows directed to the destination address indicated in the received ETR signaling message. The flow control techniques applied may include, e.g., blocking of non-responsive elastic flows and limiting other flows as a function of the upstream node's baselines for flows of the type being subjected to flow control. Accordingly, aggressive flows subject to flow control will undergo forced reductions in their flow rates at the upstream node, e.g., they will be subject to having packets dropped.

The upstream node will continue to provide flow control until receiving an ETR message from the bottleneck node 127 indicating that the congestion problem is no longer present.

The ETR method 900 of the invention stops in step 916 when the nodes implementing the method are turned off.

The various subroutines and messaging used to implement the ETR method of the present invention will now be discussed in further detail with reference to FIGS. 10-12.

Figure 10A:
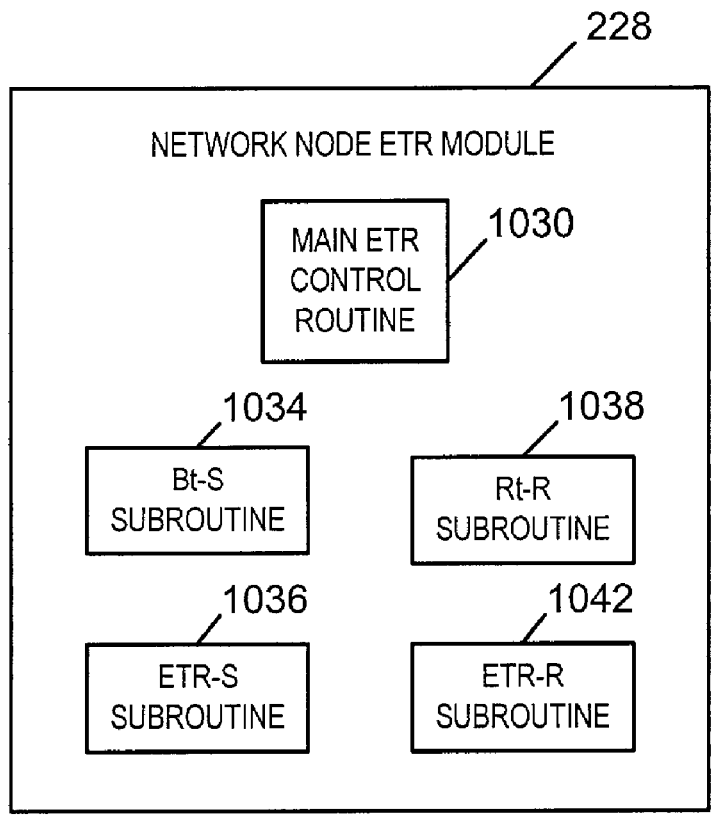
FIGS. 10A and 10B illustrate early traffic regulation modules implemented in accordance with the invention.

FIG. 10A illustrates an exemplary network node ETR module 228 which is implemented in software. The ETR module 228 includes a main ETR control routine 1030, and a plurality of subroutines. The subroutines include a Route-Receive subroutine (Rt-R) 1038, a Back-tracing message Send (Bt-S) subroutine 1034, an ETR Send (ETR-S) subroutine 1036, and an ETR Receive (ETR-R) subroutine 1042.

Figure 10B:
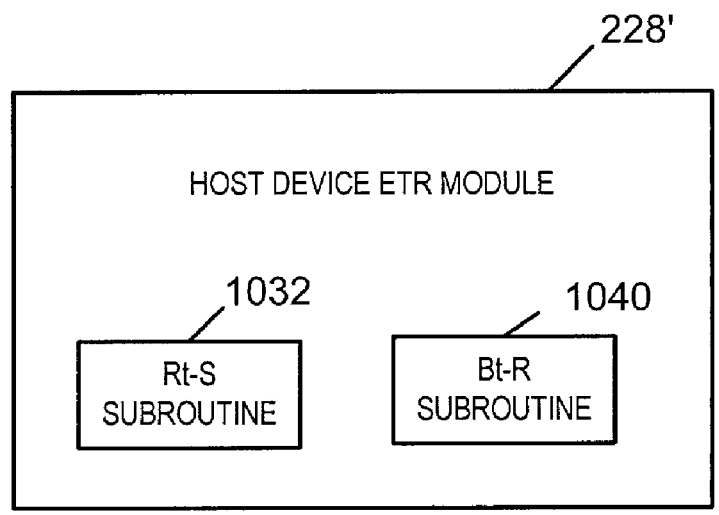

FIG. 10B illustrates an exemplary ETR module 228' suitable for use in an end-host device, e.g., device 110. The module 228' includes Route-Send (Rt-S) subroutine 1032, and a Back-tracing message Receive (Bt-R) subroutine 1040.

Some or all of the sub-routines 1034, 1036, 1038, 1042 may be implemented in a network node. The purpose and various messages generated and/or processed by the various sub-routines will now be discussed with regard to FIG. 11. It also illustrates the sub-routines at each node 110, 127, 120 used to receive and/or send the messages communication between the illustrated nodes.

Figure 11:
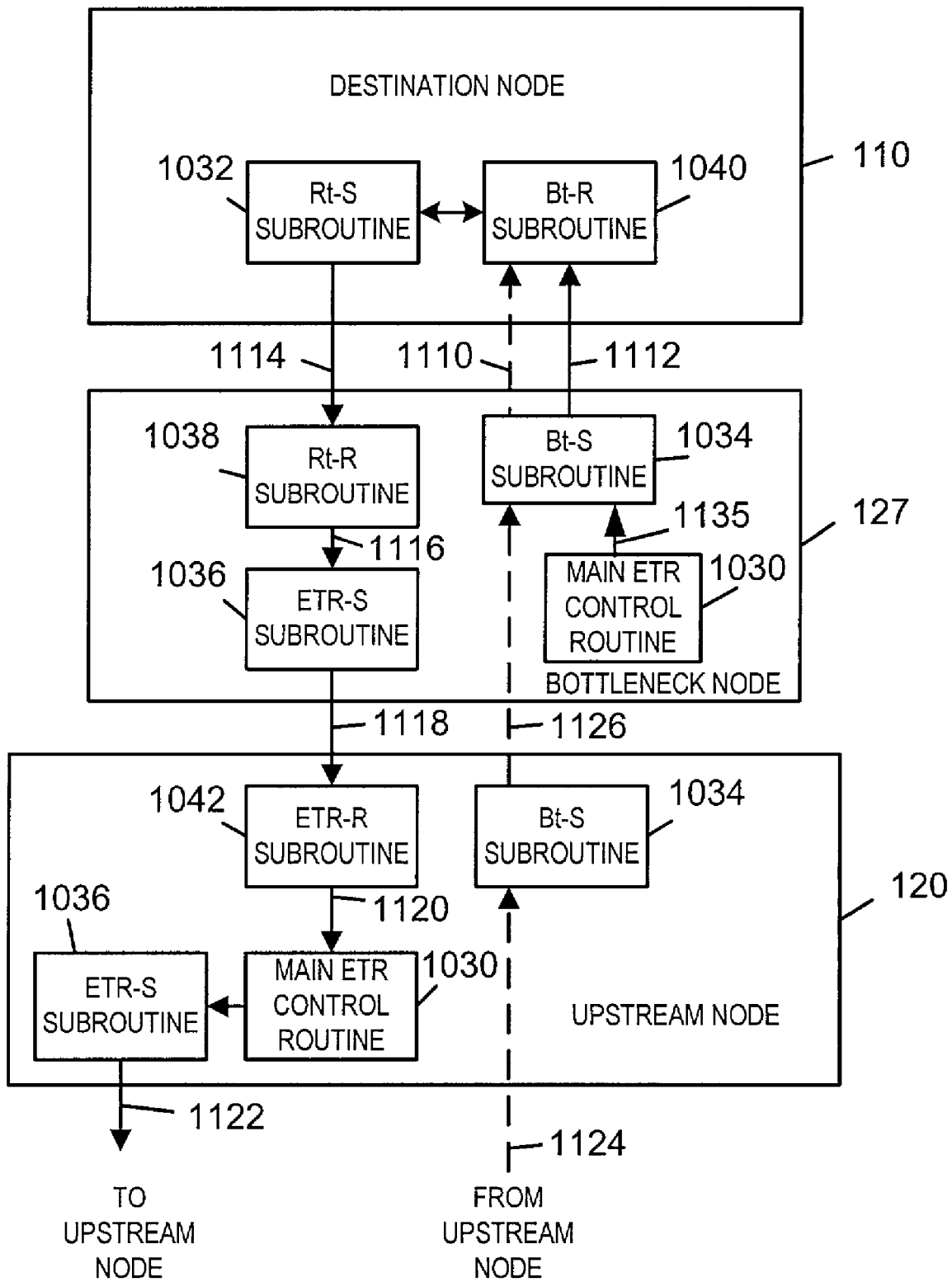
FIGS. 11 and 12 illustrate signaling between various nodes performed in accordance with the invention.

FIG. 11 illustrates messaging passed between destination node 110, bottleneck node 127 and upstream node 120 as part of the ETR method shown in FIG. 9.

In the destination node 110, two ETR subroutines are used for messaging. These are: (1) the Bt-R subroutine 1040, and (2) the Rt-S subroutine 1032. The Bt-R subroutine 1040 receives back tracing messages 1112 from upstream nodes requesting back tracing path reconstructed. In response to back tracking request messages 1112, the BT-R subroutine 1040 reconstructs back tracing path The Bt-R subroutine 1040, also receives back tracing path messages 1110 sent from network node 127 with certain probability (e.g. 1/20, 000, which corresponds to one path being determined for every 20,000 packets of a given flow that are received).

The back tracing path message 1110 indicates information relating to the network node which sent it. The information may include the network node's IP address, the IP address for the previous network node in the path, and next network node's IP address. From the received back tracing path message 1110 the Bt-R subroutine 1040 estimates Round Trip Time (RTT) based on a timestamp record "timestamp$_1$" located in the back tracing path message 1110.

The timestamp record marks the time the backtracing path message leaves each node identified in the backtracking path message. For example, the back tracing path message 1110 provides a reconstructed network-node chain originating from the node 127.

Similarly, 1126 is generated by node 120 sent to destination 110, 1124 is generated by an upstream network node. Combining n such messages received by the end-host 110, the following timestamp info can be collected: $\{R_1(\text{timestamp}_1), R_2(\text{timestamp}_2), \ldots, R_i(\text{timestamp}_i), \ldots, R_n(\text{timestamp}_n)\}$.

The $RTT_i$ from anyone of the routers listed in the message 1110 will be:

$$RTT_i = 2 \times (\text{TheTimeTheMessageWasReceived} - \text{timestamp}_i),$$

then the RTT of the network-node chain path can be estimated by $RTT \approx \max\{RTT_i | i \in [1,n]\}$. Then the RTT from the sender, source 102, to the receiver, destination device 110, RTT0, is estimated by $RTT0 = k \times RTT$. The factor k may be preset or can be determined and/or estimated by the destination node.

Figure 12:
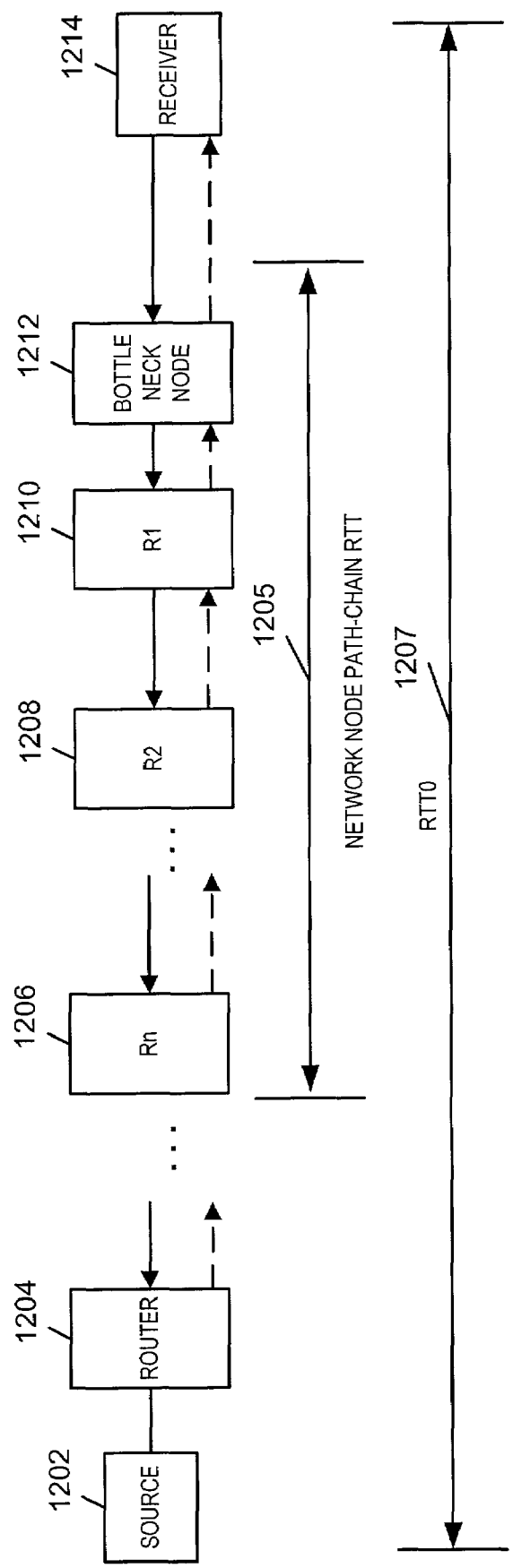

The relationship between RTT 1205, back tracing path messages and the estimated round trip time period RTT0 1207 can be seen in FIG. 12 for an exemplary communications path having a source 1202 and destination device 1214. In FIG. 12, the exemplary network node path-chain comprises, in addition to source and destination nodes 1202, 1214, respectively, nodes 1204, 1206, 1208, 1210 and 1212.

In accordance with one feature of the present invention estimated RTT0 time 1207 is conveyed to upstream nodes and is used to determine ETR signaling frequency. TCP-adaptive flows need at least one RTT0 time period 1207 to respond to congestion signals. Accordingly, in some embodiments the period between ETR control signals is made as long or longer than one RTT0 time period 1207 so that the impact of TCP adaptive flow control mechanism, alone or in conjunction with applied flow control, can be properly gauged.

Referring once again to the FIG. 11 example, the Rt-S subroutine 1032 in the destination node 110 receives path information 1110, 1126, 1124 and so forth by the Bt-R subroutine 1040 which reconstructs the tracing path. The reconstructed path is then sent as a message 1114 to the bottleneck node 127.

In the bottleneck node 127, there are three subroutines in addition to the main ETR routine 1030. As discussed above, the bottleneck node 127 requests route information from end hosts when potential flooding N-DoS congestion collapse is detected. In the bottleneck node, when congestion sufficient to merit early traffic regulation is detected, the main ETR control routine 1030 is responsible for triggering, via control signal 1135, the sending of a backtracking request message.

Three sub-routines used in the bottleneck node 127 are: (1) the Bt-S sub-routine 1034, (2) the Rt-R subroutine 1038, and (3) the ETR-S subroutine 1036.

The Bt-S subroutine 1034 sends path tracing information, e.g., path messages 1110, to downstream nodes. The path tracing messages may include path and timing information received by the Bt-S subroutine 1034 from upstream nodes. The Bt-S 1034 is also responsible for sending back tracing initiation request messages 1112 to the destination to request the reconstructed back tracing path when triggered by the control routine 1030 via the signal 1135.

The Rt-R subroutine 1038 receives reconstructed tracing-path information 1114 from one or more end hosts, e.g., destination node 110. This information identifies upstream nodes to which ETR control messages may be sent. The path information is supplied to the ETR-S subroutine 1036. The ETR-S subroutine 1036 sends ETR control messages used to trigger flow control operations to one or more prior, i.e., upstream, network nodes along the reconstructed tracing path. The ETR control messages may include, e.g., upstream path information, and information identifying flows to be subject to flow control. Flows which are to be subject to flow control may be identified in an ETR control message by destination and/or one or more other identifiers.

As mentioned above, ETR control message sending rates, e.g., to enable/disable flow control in upstream nodes are bound to RTT estimated in end hosts based on the timestamp data attached in back tracing messages. Thus, time spacing between ETR control messages will be equal to, or greater than, the estimated RTT0 time period.

In the upstream node 120, in addition to the main ETR control routine 1030, there are three subroutines: (1) the Bt-S subroutine 1034, (2) the ETR-R 1042, and (3) and the ETR-S subroutine 1036.

The Bt-S subroutine 1034 sends path tracing information in the form of message 1126 to the destination end-node.

The ETR-R subroutine 1042 in the upstream node 120 responds to ETR control messages received from downstream nodes, e.g., node 127. As part of the response to an ETR signal the main ETR control routine 1030 is triggered to initiate flow control on the flow or flows identified by information in the received ETR control message. In addition to initiating flow control in the current node, the main ETR control routine 1030 passes an ETR control message to the next upstream node, if any, identified in the received ETR message. The passed ETR control message is transmitted via the ETR-S subroutine 1036 which is responsible for transmitting ETR signals 1118 and 1122 to the nodes 120 and 127. As a result of ETR signal passing, flow control may be triggered on the identified flows in multiple upstream nodes.

In the above described manner AFFC flow control may be activated in one or more nodes preceding a bottleneck node, thereby eliminating some of the traffic directed to the bottleneck node. This upstream protection reduces the risk of congestion collapse at the bottleneck node.

Numerous variations on the above described methods and apparatus are possible without departing from the scope of the invention.

What is claimed is:

1. A packet flow control method comprising the steps of:
   detecting congestion in a first node along a packet flow path between a source device and a destination device;
   identifying a node in said path preceding said first node, wherein said step of identifying a node in said path includes the step of transmitting a signal to said destination device requesting path information; and
   transmitting to said preceding node a traffic regulation signal used to initiate flow rate control on flows identified from information included in said traffic regulation signal, wherein said information included in said traffic regulation signal includes a destination address.

2. A packet flow control method comprising the steps of:
   detecting congestion in a first node along a packet flow path between a source device and a destination device, including the step of monitoring to detect when said first node is saturated with packet traffic for a preselected period of time;
   identifying a node in said path preceding said first node, wherein said step of identifying a node in said path includes the step of transmitting a signal to said destination device requesting path information, and
   transmitting to said preceding node a traffic regulation signal used to initiate flow rate control on flows identified from information included in said traffic regulation signal, wherein said information included in said traffic regulation signal includes a destination address.

3. The method of claim 2, wherein said traffic regulation signal further includes packet flow path information.

4. The method of claim 3, further comprising the steps of:
   operating said preceding node to transmit an additional traffic regulation signal to an additional preceding node to cause the additional preceding node to initiate flow rate control on flows directed to a destination address identified in said additional traffic regulation signal.

5. A method of implementing flow control in a communications network including a first node, a second node and a destination device, the first node being located upstream of the second node on a communications path to said destination device, the method comprising the steps of:
   operating the second node to detect when the second node is saturated with traffic for a period of time, and in response to detecting such saturation, said second node performs the step of initiating a path determination operation to determine at least a portion of a path of a flow causing congestion at said second node;
   operating said second node to receive path information identifying said first node as part of said path of the flow causing congestion;
   in response to detecting that said second node is saturated with traffic for said period of time, operating the second node to send a first traffic regulation signal to the first node to trigger said first node to perform traffic regulation of flow rates on flows of packets directed to said destination device;
   operating the first node, in response to said first traffic regulation message, to perform forced flow rate reduction operations on at least some flows directed to said destination node wherein operating the first node to perform forced flow rate reduction operations includes comparing packet flow rates of packet flows directed to said destination to at least one flow rate baseline for said first node and dropping packets from packet flows directed to said destination which have flow rates exceeding the flow rate base line to which the particular flow rate is compared;
   further comprising, in said first node,
      distinguishing, for traffic flow control purposes, between packet flows corresponding to protocol types which are responsive to congestion control signals and packet flows corresponding to protocol types which are not responsive to congestion control signals.

6. A communications system for communicating information as flows of packets, the system comprising:
   a first network node including:
      i. congestion control means for detecting congestion at said first network node;
      ii. traffic flow path determination means for determining the path of at least one packet flow causing congestion at said first network node, wherein said step of determining the path includes the step of transmitting a signal to said destination device requesting path information; and
      iii. early traffic regulation signaling means for transmitting a traffic regulation signal to initiate traffic regulation at an upstream network node; and
   an upstream network node, the upstream network node being coupled to the first network node, the upstream network node including:
      i. means for receiving traffic regulation signals from said first network node; and
      ii. flow control means for performing flow rate reduction operations on one or more traffic flows identified from information included in received traffic regulation signals.

7. A communications system for communicating information as flows of packets, the system comprising:
   a first network node including:
      i. congestion control means for detecting congestion at said first network node;
      ii. traffic flow path determination means for determining the path of at least one packet flow causing congestion at said first network node; and
      iii. early traffic regulation signaling means for transmitting a traffic regulation signal to initiate traffic regulation at an upstream network node; and
   an upstream network node, the upstream network node being coupled to the first network node, the upstream network node including:
      a. means for receiving traffic regulation signals from said first network node; and
      b. flow control means for performing flow rate reduction operations on one or more traffic flows identified from information included in received traffic regulation signals; and
   a destination node coupled to said first network node for serving as the destination of at least some of the packet flows passing through the first network node, the destination node including:
      i) means for reconstructing packet flow path from received information; and ii) means for transmitting reconstructed packet flow path information to the first network node in response to a request for path information from said traffic flow path determination means.

8. The communication system of claim 7, wherein the traffic regulation signal generated by the early traffic regulation signaling means of the first network node includes a destination address corresponding to said destination node.

9. The communication system of claim 8,
wherein the first network node includes traffic flow rate baselines generated from traffic flowing through the first network node over a period of time; and
wherein the upstream network node includes traffic flow rate baselines generated from traffic flowing through the upstream network node over a period of time.

10. The communication system of claim 9,
wherein the first network node further comprises flow control means for performing a flow control operation including the dropping of packets from at least one packet flow as a function of at least one of the first network node traffic flow rate baselines.

11. The communication system of claim 10, wherein the first network node further comprises:
a plurality of packet queues, one packet queue being used to store packets corresponding to a single or each group of flows to which are to be subject to different flow rate reduction operations are part of the processing by said flow control means.

* * * * *